United States Patent
Iwasaki

(10) Patent No.: US 12,197,117 B2
(45) Date of Patent: Jan. 14, 2025

(54) IMAGE DISPLAY DEVICE AND ELECTRONIC APPARATUS

(71) Applicant: SONY SEMICONDUCTOR SOLUTIONS CORPORATION, Kanagawa (JP)

(72) Inventor: Nobuo Iwasaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 394 days.

(21) Appl. No.: 17/593,990

(22) PCT Filed: Mar. 25, 2020

(86) PCT No.: PCT/JP2020/013278
§ 371 (c)(1),
(2) Date: Sep. 29, 2021

(87) PCT Pub. No.: WO2020/209065
PCT Pub. Date: Oct. 15, 2020

(65) Prior Publication Data
US 2022/0155669 A1 May 19, 2022

(30) Foreign Application Priority Data
Apr. 12, 2019 (JP) .................. 2019-076239

(51) Int. Cl.
*G03B 21/20* (2006.01)
*G02B 27/14* (2006.01)
(Continued)

(52) U.S. Cl.
CPC ........... *G03B 33/12* (2013.01); *G02B 27/149* (2013.01); *H04N 9/3111* (2013.01); *H04N 9/3167* (2013.01); *H04N 5/7441* (2013.01)

(58) Field of Classification Search
CPC .............. G03B 21/006; G03B 21/008; G03B 21/2013; G03B 21/14; H04N 9/3111; H04N 9/312
See application file for complete search history.

(56) References Cited

U.S. PATENT DOCUMENTS 6,327,093 B1 12/2001 Nakanishi et al.
6,995,738 B2 * 2/2006 Florence ................ G09G 3/001
349/8

(Continued)

FOREIGN PATENT DOCUMENTS

JP 2000-347323 A 12/2000
JP 2002-207192 A 7/2002
(Continued)

OTHER PUBLICATIONS

International Search Report and Written Opinion of PCT Application No. PCT/JP2020/013278, issued on Jun. 9, 2020, 09 pages of ISRWO.

*Primary Examiner* — Ryan D Howard
(74) *Attorney, Agent, or Firm* — CHIP LAW GROUP

(57) ABSTRACT

An image display device includes: a first display panel and a second display panel in which transmittance or reflectance of light is controlled on the basis of an image signal; and a light irradiation unit that irradiates the first display panel and the second display panel with light, wherein the first display panel and the second display panel are sequentially driven by image signals corresponding to a plurality of color light beams, and in a period in which one of the first display panel and the second display panel is driven by an image signal corresponding to any one of the plurality of color light beams, an image signal for driving the other display panel is switched.

12 Claims, 17 Drawing Sheets

(51) Int. Cl.
*G03B 33/12* (2006.01)
*H04N 9/31* (2006.01)
*H04N 5/74* (2006.01)

(56) References Cited

U.S. PATENT DOCUMENTS

| | | | |
|---|---|---|---|
| 2003/0117357 A1 | 6/2003 | Florence | |
| 2007/0013871 A1* | 1/2007 | Marshall | H04N 9/3155 353/38 |
| 2014/0375956 A1* | 12/2014 | Khrushchev | G03B 21/2033 353/121 |

FOREIGN PATENT DOCUMENTS

| | | |
|---|---|---|
| JP | 2003-140263 A | 5/2003 |
| JP | 2003-241164 A | 8/2003 |
| KR | 10-2001-0007248 A | 1/2001 |

* cited by examiner

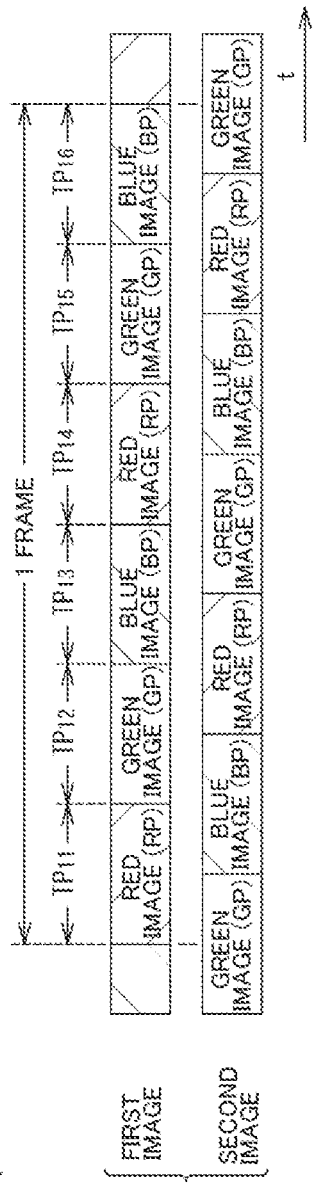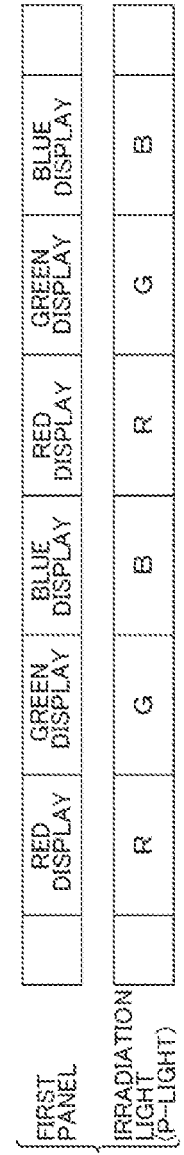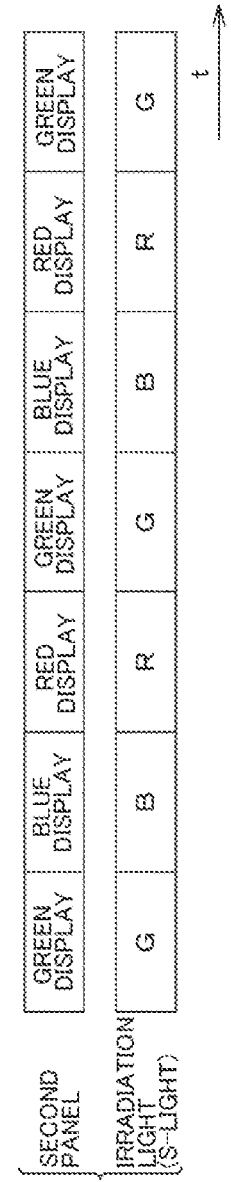
Fig. 2A
Fig. 2B

IMAGE DISPLAY DEVICE AND ELECTRONIC APPARATUS

CROSS REFERENCE TO RELATED APPLICATIONS

This application is a U.S. National Phase of International Patent Application No. PCT/JP2020/013278 filed on Mar. 25, 2020, which claims priority benefit of Japanese Patent Application No. JP 2019-076239 filed in the Japan Patent Office on Apr. 12, 2019. Each of the above-referenced applications is hereby incorporated herein by reference in its entirety.

TECHNICAL FIELD

The present disclosure relates to an image display device and an electronic apparatus.

BACKGROUND ART

In so-called field-sequential color-type image display devices, a color image is separated on the basis of a color component, and the separated red image, green image, and blue image are sequentially displayed at high speed. This type of image display device has advantages that the number of display panels can be reduced and the scale of an optical system can be reduced.

On the other hand, in the field sequential color system, since the display color of the image is sequentially switched, a phenomenon such as color break occurs. For example, when an object moves in a display screen and the viewpoint of the image observer moves, a phenomenon in which the color is separated and visually recognized occurs. Color break can be suppressed by accelerating image switching. Therefore, for example, an image display device having a configuration in which image switching is accelerated using two display panels has been proposed (see, for example, PTL 1).

CITATION LIST

Patent Literature

[PTL 1]
JP 2003-241164 A

SUMMARY

Technical Problem

For example, in the image display device disclosed in PTL 1, an operation of displaying an image based on one display panel and then displaying an image based on the other display panel is performed. Therefore, one of the display panels contributes to the display at a certain time point. Therefore, only the same brightness as that of an image display device using one display panel can be secured.

Therefore, an object of the present disclosure is to provide an image display device capable of suppressing color break and also improving brightness, and an electronic apparatus having the image display device.

Solution to Problem

An image display device according to the present disclosure for attaining the object is an image display device including: a first display panel and a second display panel in which transmittance or reflectance of light is controlled on the basis of an image signal; and a light irradiation unit that irradiates the first display panel and the second display panel with light, the device in which the first display panel and the second display panel are sequentially driven by image signals corresponding to a plurality of color light beams, and in a period in which one of the first display panel and the second display panel is driven by an image signal corresponding to any one of the plurality of color light beams, an image signal for driving the other display panel is switched.

An electronic apparatus according to the present disclosure for attaining the object is an electronic apparatus provided with an image display device including: a first display panel and a second display panel in which transmittance or reflectance of light is controlled on the basis of an image signal; and a light irradiation unit that irradiates the first display panel and the second display panel with light, the device in which the first display panel and the second display panel are sequentially driven by image signals corresponding to a plurality of color light beams, and in a period in which one of the first display panel and the second display panel is driven by an image signal corresponding to any one of the plurality of color light beams, an image signal for driving the other display panel is switched.

BRIEF DESCRIPTION OF DRAWINGS

FIGS. 2A and 2B are diagrams for describing the operation of the image display device. FIG. 2A is a schematic timing chart for describing the relationship between a first image displayed based on the operation of a first display panel and the like and a second image displayed based on the operation of a second display panel and the like. FIG. 2B is a schematic timing chart for describing the relationship between the drive timing of the first display panel and the switching timing of the irradiation light to the first display panel and the relationship between the drive timing of the second display panel and the switching timing of the irradiation light to the second display panel.

DESCRIPTION OF EMBODIMENTS

Figure 1:
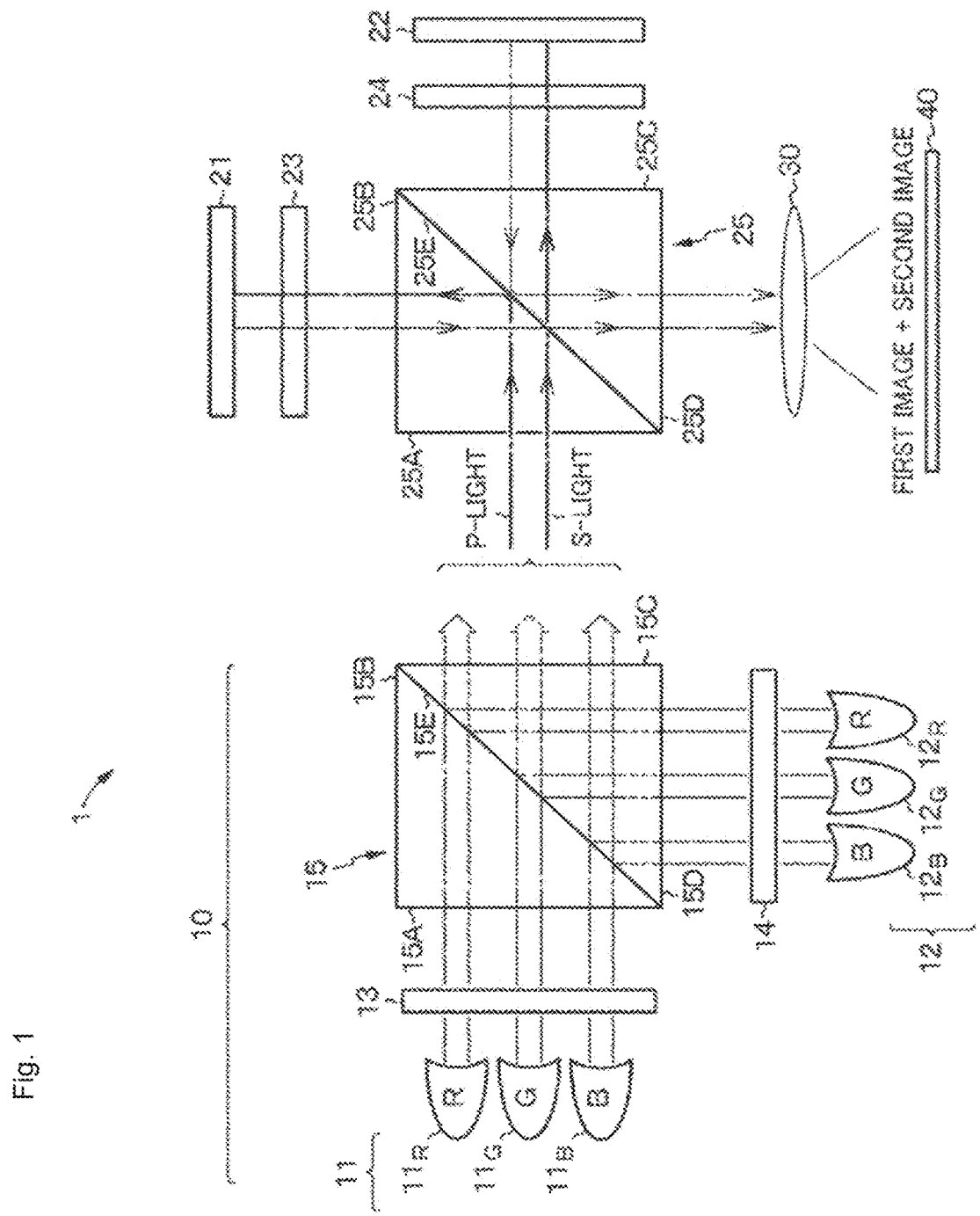
FIG. 1 is a schematic diagram for describing a configuration of an image display device according to a first embodiment of the present disclosure.

Hereinafter, the present disclosure will be described based on the embodiments with reference to the drawings. The present disclosure is not limited to the embodiments, and various numerical values and materials in the embodiments are examples. In the following description, the same reference signs will be used for the same elements or the elements having the same function, and redundant description will be omitted. The description will be given in the following order.

1. Overall description of image display device and electronic apparatus related to present disclosure
2. First embodiment
3. Second embodiment
4. Others
5. Configuration of present disclosure Overall Description of Image Display Device and Electronic Apparatus Related to Present Disclosure In an image display device according to the present disclosure, or an image display device used for an electronic apparatus according to the present disclosure (hereinafter, these devices may be referred to simply as an image display device of the present disclosure), a light irradiation unit may irradiate a first display panel with color light corresponding to an image signal for driving the first display panel and irradiate a second display panel with color light corresponding to an image signal for driving the second display panel.

In this case, the light irradiation unit may stop irradiation with light on the first display panel and the second display panel in a predetermined period including the time of switching the image signal for driving the first display panel and a predetermined period including the time of switching the image signal for driving the second display panel.

By stopping the irradiation with light, the display image is displayed in black at predetermined intervals. As a result, since it is possible to reduce color mixing due to screen switching and the like, the color gamut of the display image can be improved. In some cases, the frequency of stopping the irradiation with light may be reduced. For example, the irradiation with light may be stopped in the first display panel only in the predetermined period including the time of switching the image signal for driving the first panel, and the irradiation with light may be stopped in the second display panel only in the predetermined period including the time of switching the image signal for driving the second display panel.

In the image display device of the present disclosure including the preferred configurations, the first display panel and the second display panel may be sequentially driven by image signals corresponding to red light, green light, and blue light, respectively, and the irradiation unit may irradiate the first display panel with color light corresponding to the image signal for driving the first display panel and may irradiate the second display panel with color light corresponding to the image signal for driving the second display panel.

The image display device of the present disclosure including the preferred configurations may further include a projection unit that projects a first image obtained by the first display panel and a second image obtained by the second display panel in a superimposed manner. The configuration of the projection unit is not particularly limited, and can be configured using a well-known optical member such as a lens or a prism.

The image display device of the present disclosure including the preferable configurations may further include a polarizing beam splitter having a first surface on which the light from the light irradiation unit is incident, a second surface and a third surface from which the incident light is emitted, and a fourth surface from which light having passed through the first display panel and light having passed through the second display panel are emitted, and the first display panel may be disposed to face the second surface, and the second display panel may be disposed to face the third surface.

In this case, a predetermined wave plate may be disposed between the second surface of the polarizing beam splitter and the first display panel and between the third surface of the polarizing beam splitter and the second display panel.

In this case, the light irradiation unit may irradiate the first surface of the polarizing beam splitter with light in a first polarized state and light in a second polarized state, and the light in the first polarized state may be emitted from the second surface of the polarizing beam splitter, and the light in the second polarized state may be emitted from the third surface of the polarizing beam splitter.

In the image display device of the present disclosure having the preferable configuration, the light irradiation unit may include a light source capable of emitting a plurality of color light beams.

In this case, the light irradiation unit may include a first light source for emitting the light in the first polarized state and a second light source for emitting the light in the second polarized state. Further, the light irradiation unit may further include a light irradiation polarizing beam splitter having a first incident surface on which the light from the first light source is incident, a second incident surface on which the light from the second light source is incident, and an emission surface from which the light from the first light source and the second light source are emitted.

Alternatively, the light irradiation unit may include a polarization adjusting element capable of switching the light between the first polarized state and the second polarized state for each of the plurality of color light beams.

As the display panel used in the image display devices of the present disclosure including the preferable configurations (hereinafter, these devices are sometimes referred to simply as the present disclosure), a well-known display panel such as a transmissive or reflective liquid crystal display panel or a LCOS display panel (Liquid Crystal On Silicon, LCOS is a registered trademark) can be used.

The polarizing beam splitter used in the present disclosure has a function of splitting a light beam into two beams. The polarizing beam splitter includes a prism or the like made of an optical material such as glass. In the case of a cube-type beam splitter, the inclined surfaces of two right-angled prisms are joined to each other, and an optical thin film for branching light into substantially halves is formed on the inclined surface of one prism.

The light source used in the light irradiation unit is not particularly limited, and a well-known light source such as a light emitting diode or a laser can be used. Since it is necessary to switch the color light at high speed, it is basically preferable to use a light source produced by semiconductor technology.

As an electronic apparatus provided with the image display device of the present disclosure, a projector and the like used in a display system for a large-scale conference room or an entertainment can be exemplified.

In various conditions in the present specification, the presence of various design or manufacturing variations is allowable. The figures used in the following description are schematic. For example, FIG. 1 described later illustrates the structure of an image display device, but does not illustrate the ratios such as width, height, thickness, and the like.

First Embodiment

The first embodiment relates to an image display device according to the present disclosure.

FIG. 1 is a schematic diagram for describing a configuration of an image display device according to the first embodiment of the present disclosure.

An image display device 1 includes a first display panel 21 and a second display panel 22 in which the transmittance or reflectance of light is controlled on the basis of an image signal, and a light irradiation unit 10 that irradiates the first display panel 21 and the second display panel 22 with light. Further, the image display device 1 further includes a projection unit 30 that projects a first image obtained by the first display panel 21 and a second image obtained by the second display panel 22 in a superimposed manner. The superimposed image is projected on a screen 40 installed on, for example, a wall surface. The operation of the entire image display device 1 is controlled by, for example, a control circuit (not illustrated) or the like.

As will be described in detail later with reference to FIGS. 2A, 2B, 3, 4, 5, 6, 7, and 8 described later, the first display panel 21 and the second display panel 22 are sequentially driven by image signals corresponding to the plurality of color light beams. Then, within a period in which one of the first display panel 21 and the second display panel 22 is driven by an image signal corresponding to any one of the plurality of color light beams, the image signal for driving the other display panel is switched. Further, the light irradiation unit irradiates the first display panel 21 with color light corresponding to the image signal for driving the first display panel 21, and irradiates the second display panel 22 with color light corresponding to the image signal for driving the second display panel 22.

More specifically, the first display panel 21 and the second display panel 22 are sequentially driven by image signals corresponding to the red light, the green light, and the blue light. Then, the light irradiation unit irradiates the first display panel 21 with color light corresponding to the image signal for driving the first display panel 21, and irradiates the second display panel 22 with color light corresponding to the image signal for driving the second display panel 22.

Next, the configuration of the image display device 1 will be described. The image display device 1 further includes a polarizing beam splitter 25 having a first surface (represented by reference sign 25A) on which the light from the light irradiation unit 10 is incident, a second surface (represented by reference sign 25B) and a third surface (represented by reference sign 25C) from which the incident light is emitted, and a fourth surface (represented by reference sign 25D) from which light having passed through the first display panel 21 and light having passed through the second display panel 22 are emitted. Reference numeral 25E indicates an interface formed by an optical thin film or the like in the polarizing beam splitter 25.

The first display panel 21 is disposed to face the second surface 25B, and the second display panel 22 is disposed to face the third surface 25C. The first display panel 21 and the second display panel 22 are formed of a reflective display panel such as LCOS, for example.

$\lambda$/4-wave plates 23 and 24 as predetermined wave plates are disposed between the second surface 25B of the polarizing beam splitter 25 and the first display panel 21 and between the third surface 25C of the polarizing beam splitter 25 and the second display panel 22, respectively. The projection unit 30 is disposed on the fourth surface side of the polarizing beam splitter 25.

The light irradiation unit 10 irradiates the first surface 25A of the polarizing beam splitter 25 with light in a first polarized state (hereinafter sometimes referred to as P-light) and light in a second polarized state (hereinafter sometimes referred to as S-light). The light in the first polarized state is reflected by the interface 25E, and the light in the second polarized state travels straight without being reflected. Therefore, the light (P-light) in the first polarized state is emitted from the second surface 25B of the polarizing beam splitter 25, and the light (S-light) in the second polarized state is emitted from the third surface 25C of the polarizing beam splitter 25.

The light emitted from the second surface 25B of the polarizing beam splitter 25 reaches the first display panel 21 via the wave plate 23. The first display panel 21 acts as a light bulb, and light whose brightness is controlled according to a video signal is incident on the second surface 25B of the polarizing beam splitter 25 via the wave plate 23. This reflected light travels straight through the polarizing beam splitter 25 and is emitted from the fourth surface 25D to form a first image. Further, the light emitted from the third surface 25C of the polarizing beam splitter 25 reaches the second display panel 22 via the wave plate 24. The second display panel 22 acts as a light bulb, and light whose brightness is controlled according to a video signal is incident on the third surface 25C of the polarizing beam splitter 25 via the wave plate 24. This reflected light is reflected by the interface 25E and is emitted from the fourth surface 25D to form a second image. Therefore, an image in which the first image and the second image are superimposed is displayed on the screen 40.

Next, the configuration of the light irradiation unit 10 will be described. The light irradiation unit 10 includes a light source capable of emitting a plurality of color light beams. More specifically, the light irradiation unit 10 includes a first light source 11 for emitting light in the first polarized state and a second light source 12 for emitting light in the second polarized state. The first light source 11 includes a red light source $11_R$, a green light source $11_G$, and a blue light source $11_B$. Similarly, the second light source 12 includes a red light source $12_R$, a green light source $12_G$, and a blue light source $12_B$.

The red light source $11_R$, the green light source $11_G$, and the blue light source $11_B$ constituting the first light source 11 are configured to be capable of emitting or not emitting light individually. Similarly, the red light source $12_R$, the green light source $12_G$, and the blue light source $12_B$ constituting the second light source 12 are also configured so that emission or non-emission of light can be individually controlled. These light sources are formed of, for example, a semiconductor laser, a light emitting diode, or the like.

Further, the light irradiation unit 10 further includes a light irradiation polarizing beam splitter 15 having a first incident surface 15A on which the light from the first light source 11 is incident, a second incident surface 15D on which the light from the second light source is incident, and an emission surface 15C from which the light from the first light source and the second light source is emitted. The light irradiation polarizing beam splitter 15 further has a surface 15B, which is not involved in light irradiation. Further, reference sign 15E indicates an interface formed by an optical thin film or the like in the light irradiation polarizing beam splitter 15. A polarizing plate 13 that puts the irradiation light into the first polarized state is disposed between the first light source 11 and the light irradiation polarizing beam splitter 15. Further, a polarizing plate 14 that puts the irradiation light into the second polarized state is disposed between the second light source 12 and the light irradiation polarizing beam splitter 15.

The light (P-light) of the first light source 11 having passed through the polarizing plate 13 travels straight through the light irradiation polarizing beam splitter 15 and is emitted from the emission surface 15C. On the other hand, the light (S-light) of the second light source 12 having passed through the polarizing plate 14 is reflected by the interface 15E and is emitted from the emission surface 15C.

The configuration of the image display device 1 has been described above. Next, the operation of the image display device 1 will be described in detail.

FIGS. 2A and 2B are diagrams for describing the operation of the image display device. FIG. 2A is a schematic timing chart for describing the relationship between the first image displayed based on the operation of the first display panel and the like and the second image displayed based on the operation of the second display panel and the like. FIG. 2B is a schematic timing chart for describing the relationship between the drive timing of the first display panel and the switching timing of the irradiation light to the first display panel and the relationship between the drive timing of the second display panel and the switching timing of the irradiation light to the second display panel.

In the image display device 1, the frame frequency is set to, for example, 60 Hz. As illustrated in FIG. 2A, one frame is composed of six subframes. Each subframe is basically composed of a repetition of a red image (represented by reference sign RP), a green image (represented by reference sign GP), and a blue image (represented by reference sign BP). The frequency of the subframe is 360 Hz. Further, the lengths of the display periods of the red image, the green image, and the blue image are the same.

As illustrated in FIG. 2B, the first display panel 21 and the second display panel 22 are sequentially driven by image signals corresponding to the plurality of color light beams. Within a period in which one of the first display panel 21 and the second display panel 22 is driven by an image signal corresponding to any one of the plurality of color light beams, the image signal for driving the other display panel is switched. Further, the light irradiation unit 10 irradiates the first display panel 21 with color light corresponding to the image signal for driving the first display panel 21, and irradiates the second display panel 22 with color light corresponding to the image signal for driving the second display panel 22.

In the example illustrated in FIG. 2B, the first display panel 21 and the second display panel 22 are driven so that the display timings thereof are shifted by approximately half of the subframe. The display panels are driven so that the display colors thereof do not overlap at a certain timing. Both the first display panel 21 and the second display panel 22 are continuously irradiated with color light corresponding to the image signal.

Hereinafter, the operation in each period based on the subframe of the first image illustrated in FIG. 2A will be described in detail with reference to the drawings.

Figure 3:
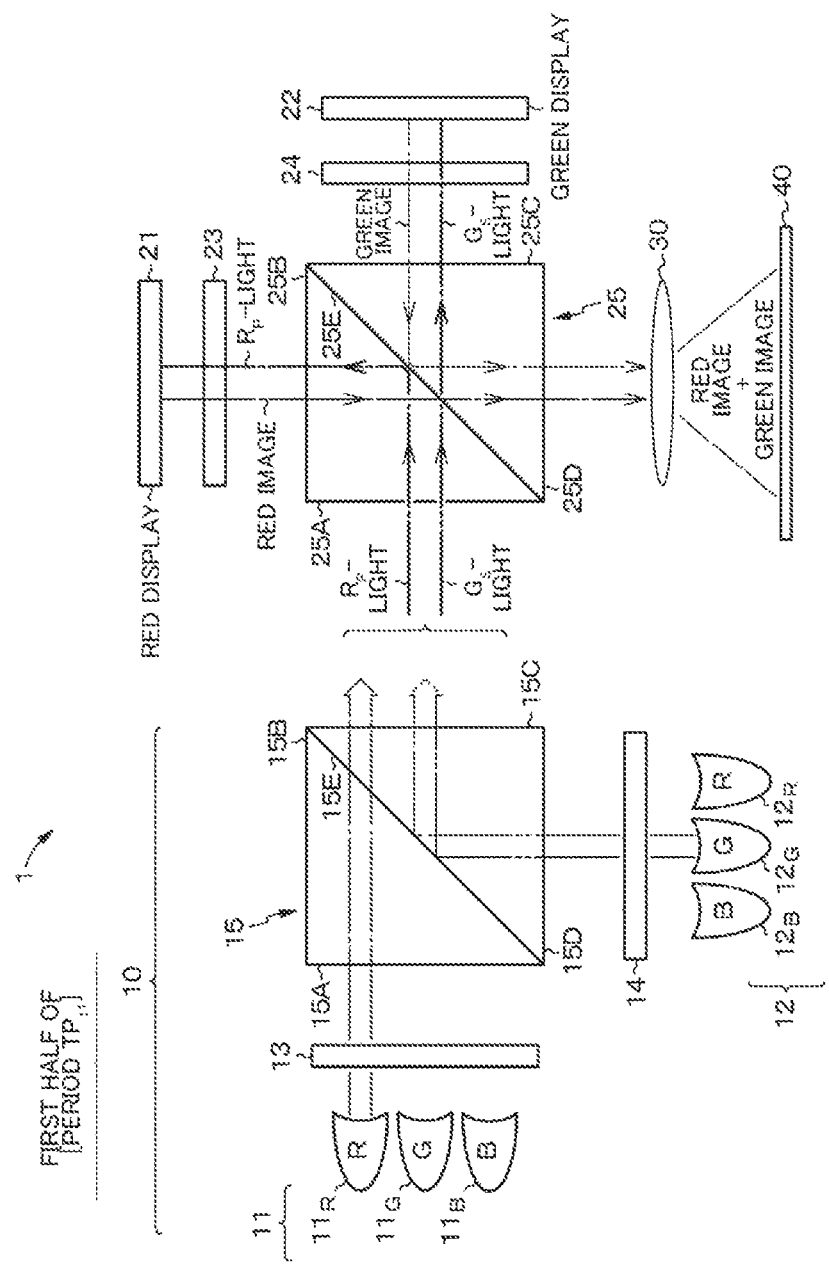
FIG. 3 is a schematic diagram for describing the operation of the image display device in the first half of the period TP11 illustrated in FIG. 2A.

First Half of [Period $TP_{11}$] (see FIG. 3)

The first display panel 21 is driven by a red image signal in the frame. Further, the second display panel 22 is driven by a green image signal in the immediately preceding frame. Only the red light source $11_R$ in the first light source 11 is in the emission state, and only the green light source $12_G$ in the second light source 12 is in the emission state. The first image is a red image and the second image is a green image.

Figure 4:
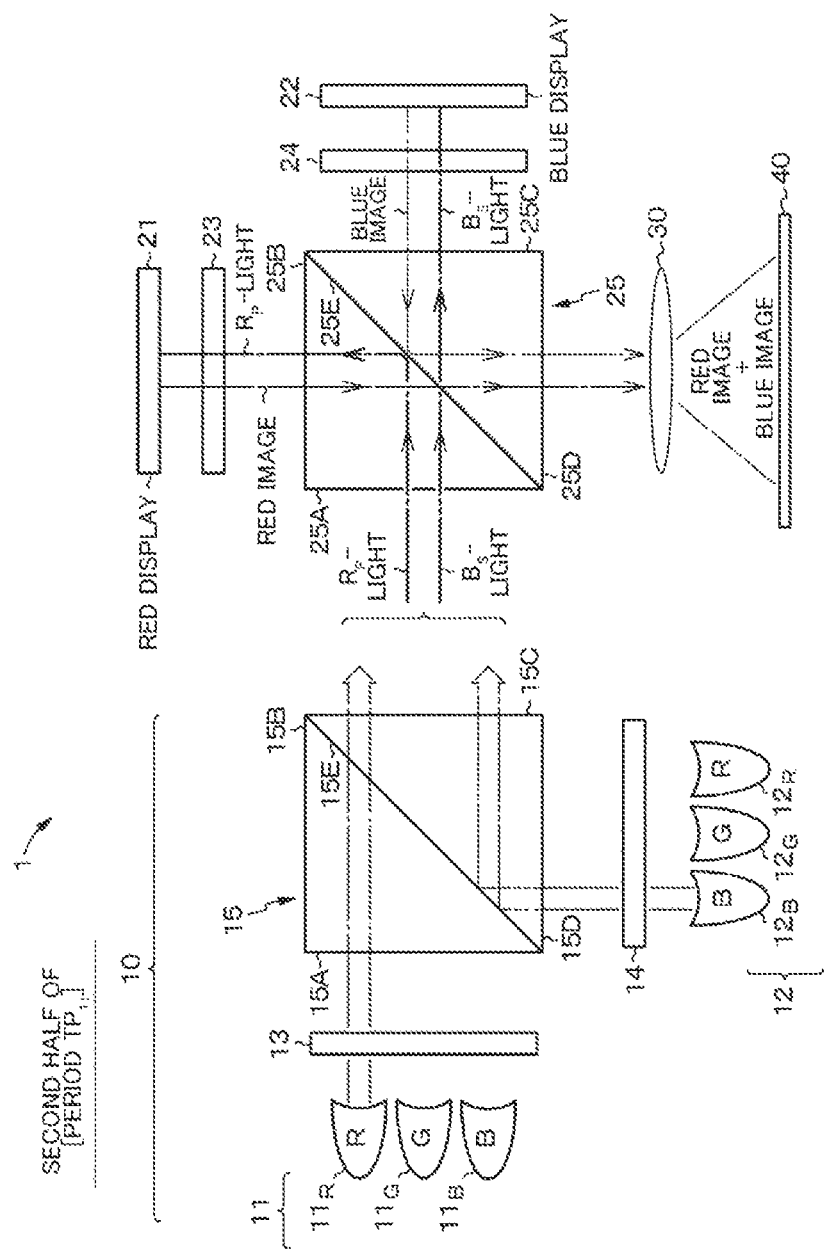
FIG. 4 is a schematic diagram for describing the operation of the image display device in the second half of the period TP11 illustrated in FIG. 2A.

Second Half of [Period $TP_{11}$] (see FIG. 4)

The first display panel 21 is subsequently driven by the red image signal in the frame. The image signal to the second display panel 22 is switched, and the second display panel 22 is driven by a blue image signal in the frame. Only the red light source $11_R$ in the first light source 11 is continuously in the emission state, and only the blue light source 12B in the second light source 12 is in the emission state. The first image is a red image and the second image is a blue image.

Figure 5:
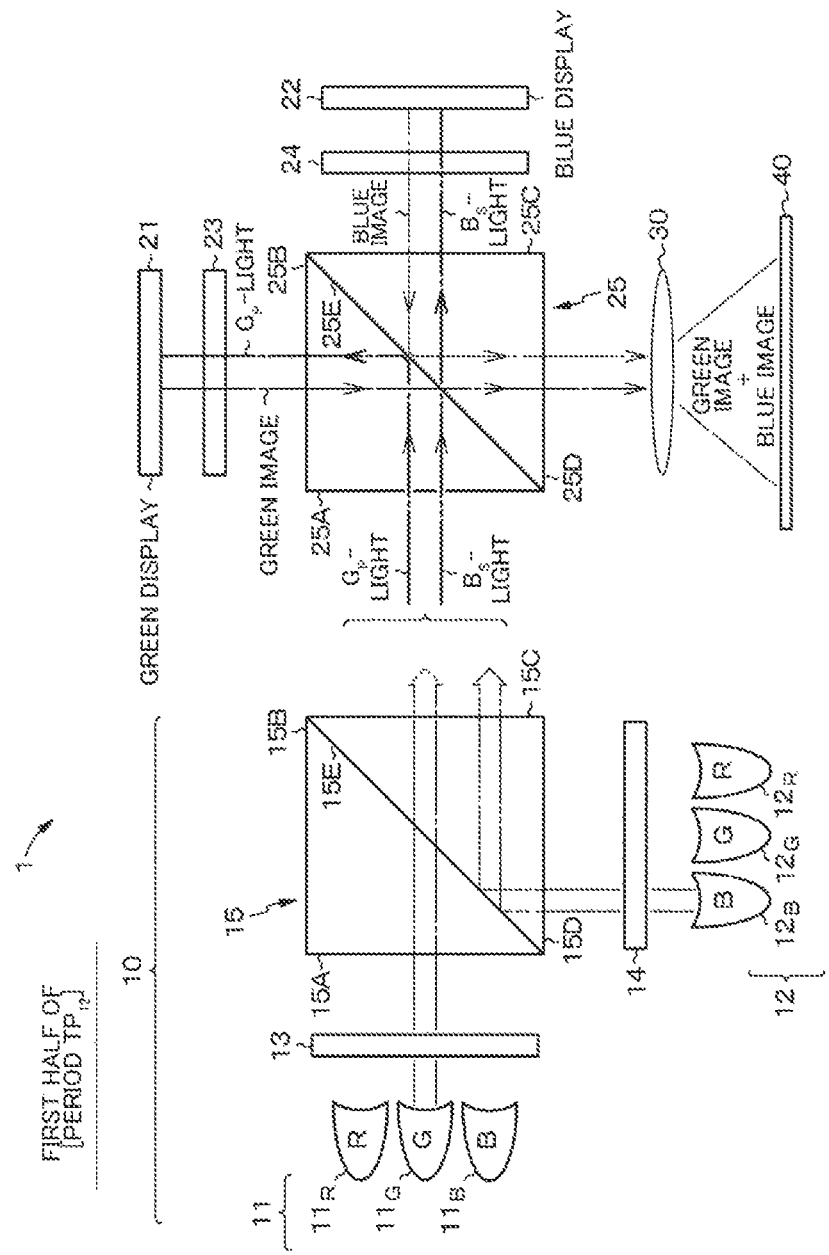
FIG. 5 is a schematic diagram for describing the operation of the image display device in the first half of the period TP12 illustrated in FIG. 2A.

First Half of [Period $TP_{12}$] (see FIG. 5)

The second display panel 22 is subsequently driven by the blue image signal in the frame. The image signal to the first display panel 21 is switched, and the first display panel 21 is driven by the green image signal in the frame. Only the green light source $11_G$ in the first light source 11 is in the emission state, and only the blue light source $12_G$ in the second light source 12 is continuously in the emission state. The first image is a green image and the second image is a blue image.

Figure 6:
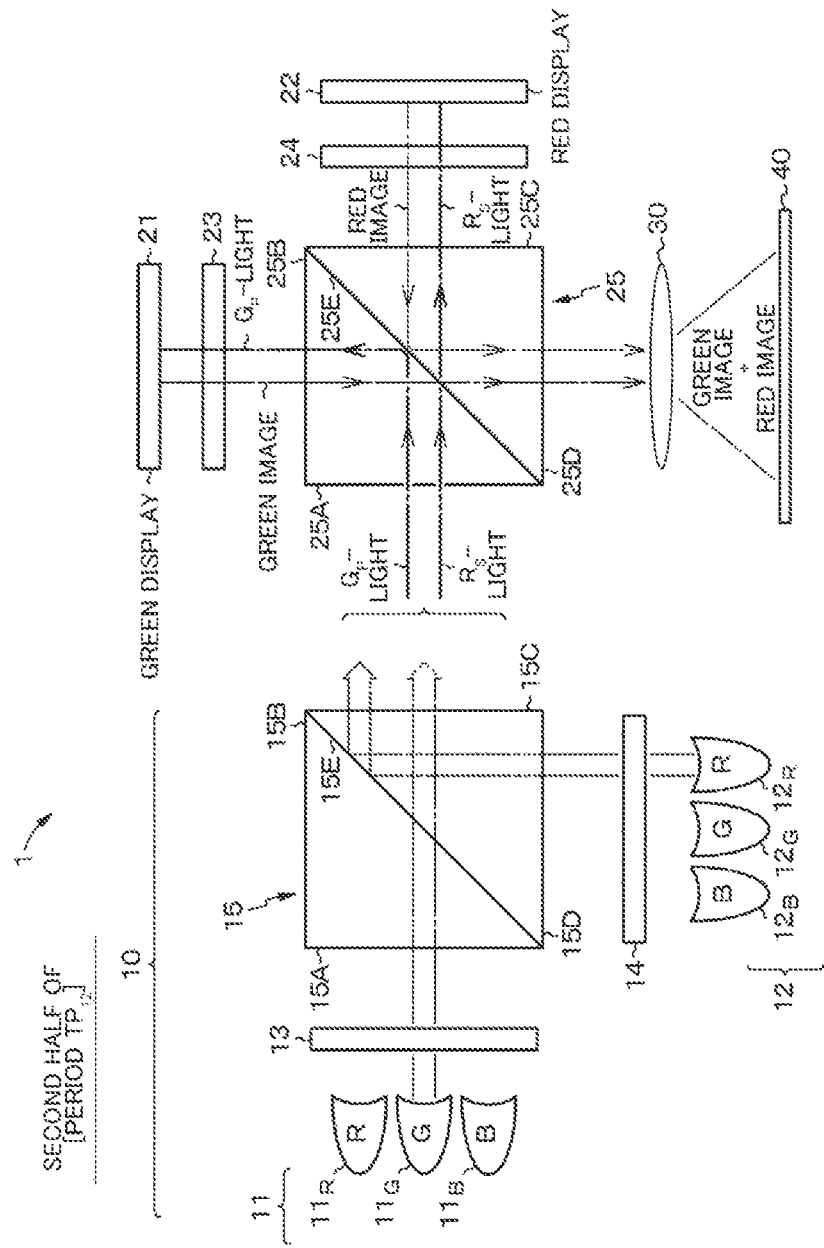
FIG. 6 is a schematic diagram for describing the operation of the image display device in the second half of the period TP12 illustrated in FIG. 2A.

Second Half of [Period $TP_{12}$] (see FIG. 6)

The first display panel 21 is subsequently driven by the green image signal in the frame. The image signal to the second display panel 22 is switched, and the second display panel 22 is driven by the red image signal in the frame. Only the green light source $11_G$ in the first light source 11 is continuously in the emission state, and only the red light source $12_R$ in the second light source 12 is in the emission state. The first image is a green image and the second image is a red image.

Figure 7:
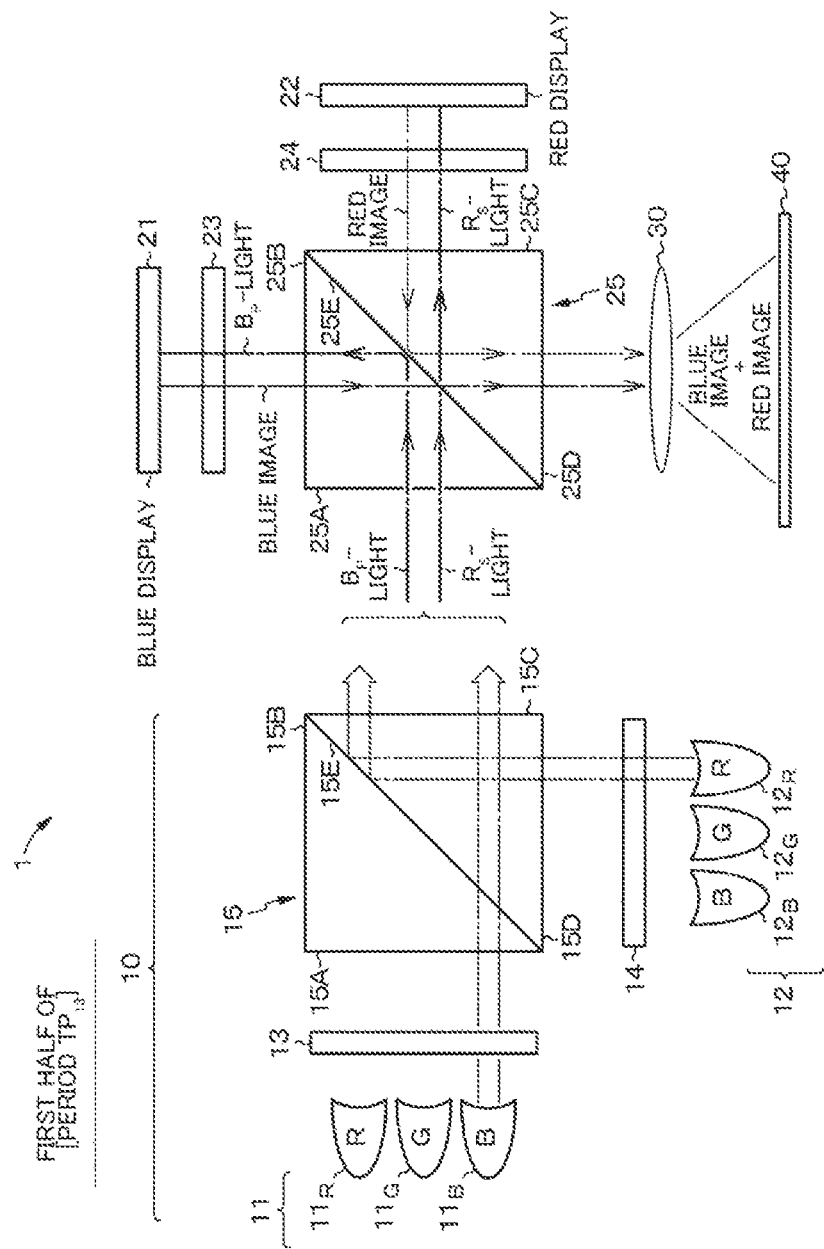
FIG. 7 is a schematic diagram for describing the operation of the image display device in the first half of the period TP13 illustrated in FIG. 2A.

First Half of [Period $TP_{13}$] (see FIG. 7)

The second display panel 22 is subsequently driven by the red image signal in the frame. The image signal to the first display panel 21 is switched, and the first display panel 21 is driven by the blue image signal in the frame. Only the blue light source $11_B$ in the first light source 11 is in the emission state, and only the red light source $12_R$ in the second light source 12 is continuously in the emission state. The first image is a blue image and the second image is a red image.

Figure 8:
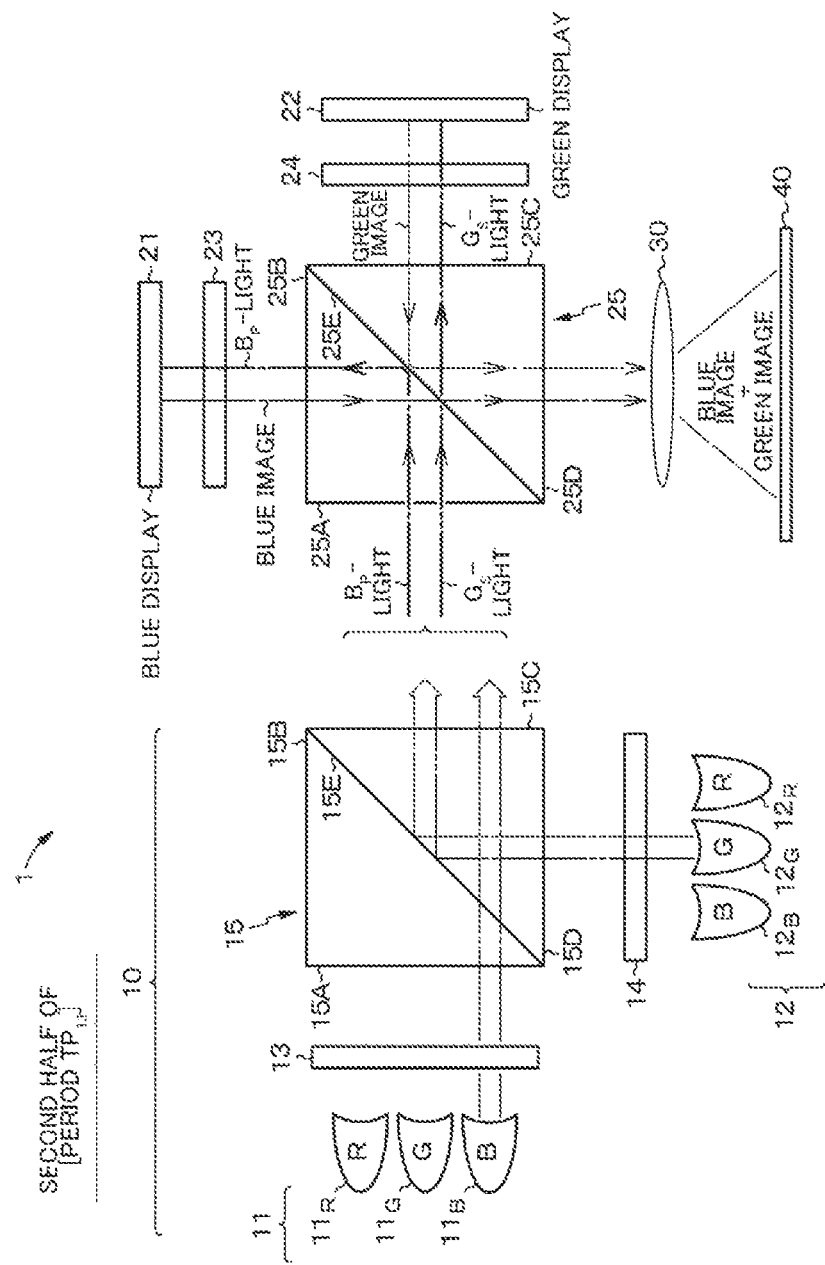
FIG. 8 is a schematic diagram for describing the operation of the image display device in the second half of the period TP13 illustrated in FIG. 2A.

Second Half of [Period $TP_{13}$] (see FIG. 8)

The first display panel 21 is subsequently driven by the blue image signal in the frame. The image signal to the second display panel 22 is switched, and the second display panel 22 is driven by the green image signal in the frame. Only the blue light source $11_B$ in the first light source 11 is continuously in the emission state, and only the green light source $12_G$ in the second light source 12 is in the emission state. The first image is a blue image and the second image is a green image.

Since the operations in [Period $TP_{14}$] to [Period $TP_{16}$] are basically the same as the operations in [Period $TP_{11}$] to [Period $TP_{13}$] described above, the description thereof will be omitted.

As described above, since the display color of the image in which the first image and the second image are superimposed changes at a high frequency (720 Hz in the above example) exceeding the frame frequency, color break can be suppressed. Further, since both the first display panel 21 and the second display panel 22 are continuously irradiated with color light corresponding to the image signal, it is possible to improve the brightness.

In some cases, the light irradiation unit may stop irradiation with light on the first display panel 21 and the second display panel in a predetermined period including the time of switching the image signal for driving the first display panel 21 and a predetermined period including the time of switching the image signal for driving the second display panel. By stopping the irradiation with light, the display image is displayed in black at predetermined intervals.

Figure 9:
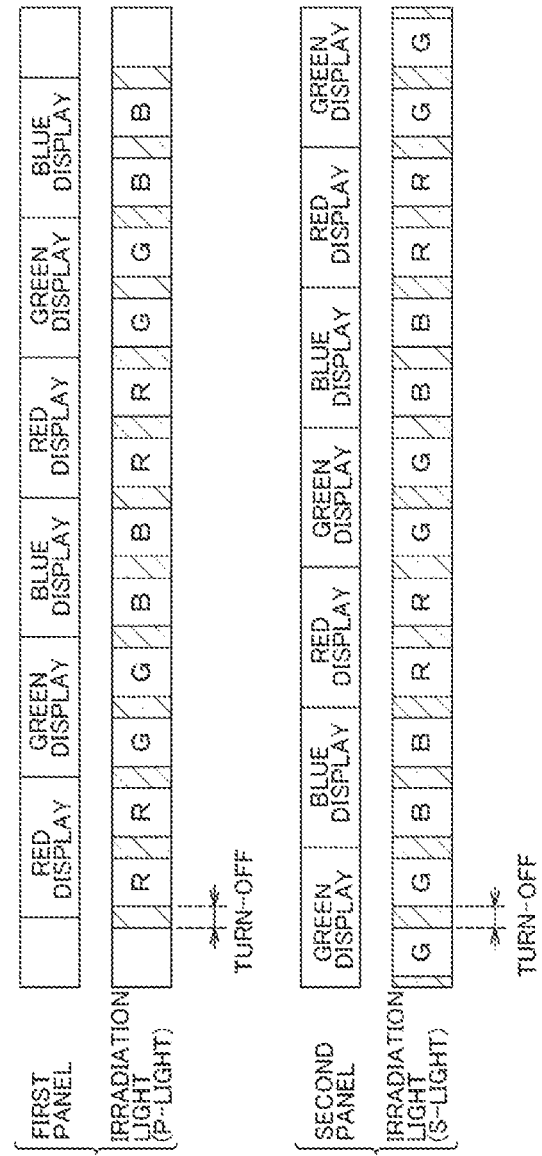
FIG. 9 is a schematic timing chart for describing a driving example when the black display is inserted.

FIG. 9 is a schematic timing chart for describing a driving example when the black display is inserted.

By inserting the black display, since it is possible to reduce color mixing due to screen switching and the like, the color gamut of the display image can be improved. In some cases, the frequency of stopping the irradiation with light may be reduced. For example, the irradiation with light may be stopped in the first display panel only in the predetermined period including the time of switching the image signal for driving the first panel, and the irradiation with light may be stopped in the second display panel only in the predetermined period including the time of switching the image signal for driving the second display panel.

Second Embodiment

The second embodiment also relates to the image display device according to the present disclosure.

The image display device according to the second embodiment has the same configuration as the image display device according to the first embodiment, except that the configuration of the light irradiation unit is different.

Figure 10:
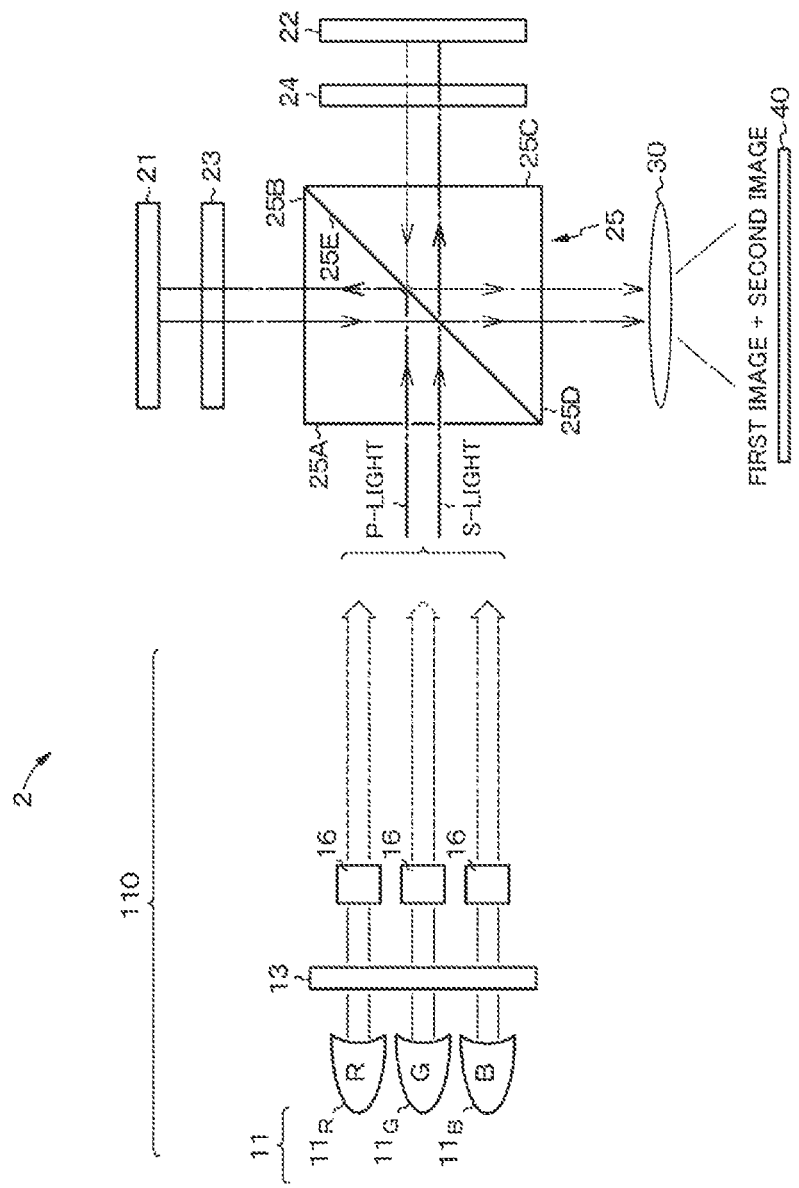
FIG. 10 is a schematic diagram for describing a configuration of an image display device according to a second embodiment of the present disclosure.

FIG. 10 is a schematic diagram for describing the configuration of an image display device according to the second embodiment of the present disclosure.

The light irradiation unit 110 in an image display device 2 also includes a light source 11 capable of emitting a plurality of color light beams. The light source 11 has the same configuration as the first light source in the first embodiment, and includes a red light source $11_R$, a green light source $11_G$, and a blue light source $11_B$. The light irradiation unit 110 includes a polarization adjusting element 16 capable of switching the light between the first polarized state and the second polarized state for each of the plurality of color light beams. The polarization adjusting element 16 is individually provided corresponding to each of the red light source $11_R$, the green light source $11_G$, and the blue light source $11_B$.

The polarizing plate 13 is disposed to put the light of the light source 11 into, for example, the first polarized state. The polarization adjusting element 16 is set to be able to control whether the light in the first polarized state will be transmitted as it is or the light in the first polarized state will be transmitted in the second polarized state.

In the image display device 2, as illustrated in FIGS. 2A and 2B referred to in the first embodiment, the first display panel 21 and the second display panel 22 are sequentially driven by image signals corresponding to the plurality of color light beams. Within a period in which one of the first display panel 21 and the second display panel 22 is driven by an image signal corresponding to any one of the plurality of color light beams, the image signal for driving the other display panel is switched. Further, the light irradiation unit 110 irradiates the first display panel 21 with color light corresponding to the image signal for driving the first display panel 21, and irradiates the second display panel 22 with color light corresponding to the image signal for driving the second display panel 22.

Hereinafter, the operation of the image display device 2 in each period based on the subframe of the first image illustrated in FIG. 2A will be described in detail with reference to the drawings.

Figure 11:
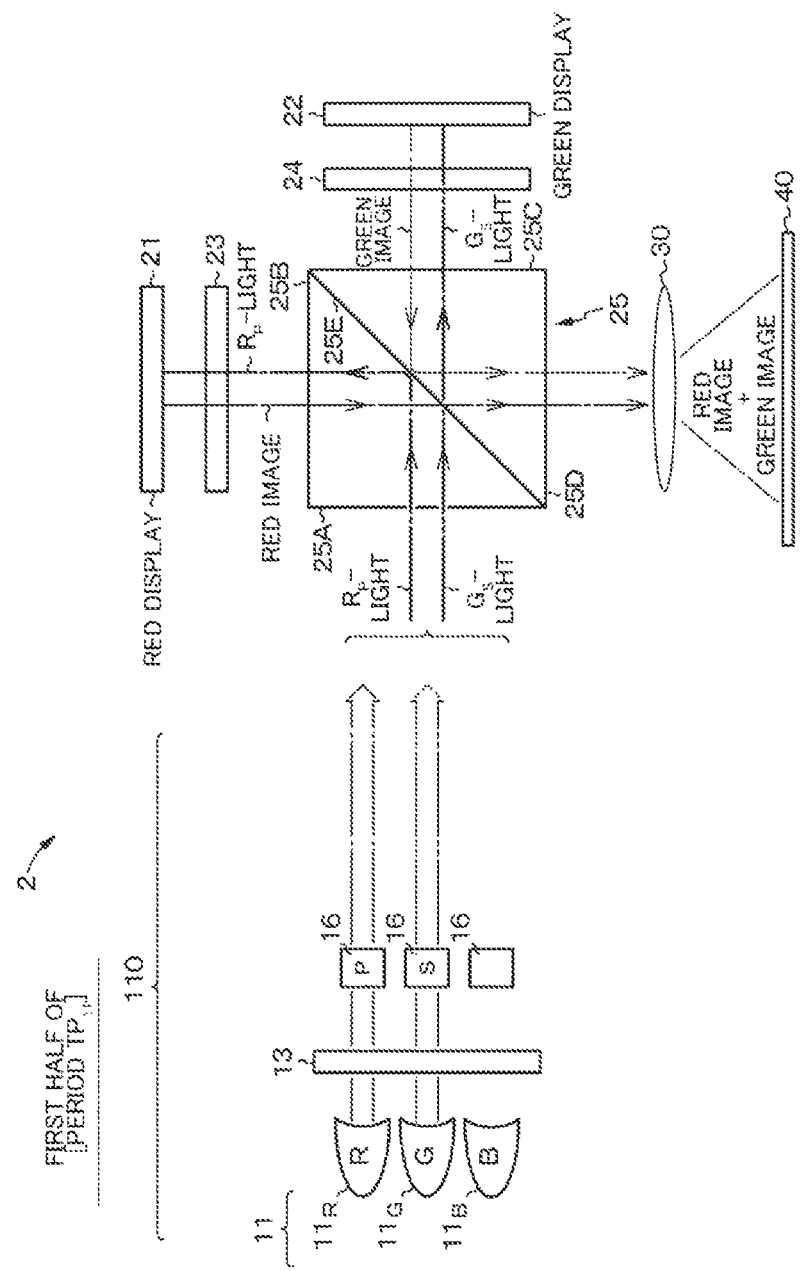
FIG. 11 is a schematic diagram for describing the operation of the image display device in the first half of the period TP11 illustrated in FIG. 2A.

First Half of [Period $TP_{11}$] (see FIG. 11)

The first display panel 21 is driven by a red image signal in the frame. Further, the second display panel 22 is driven by a green image signal in the immediately preceding frame. In the light source 11, the red light source $11_R$ and the green light source $11_G$ are in the emission state. The polarization adjusting element 16 leaves the red light in the first polarized state and puts the green light into the second polarized state. The first image is a red image and the second image is a green image.

Figure 12:
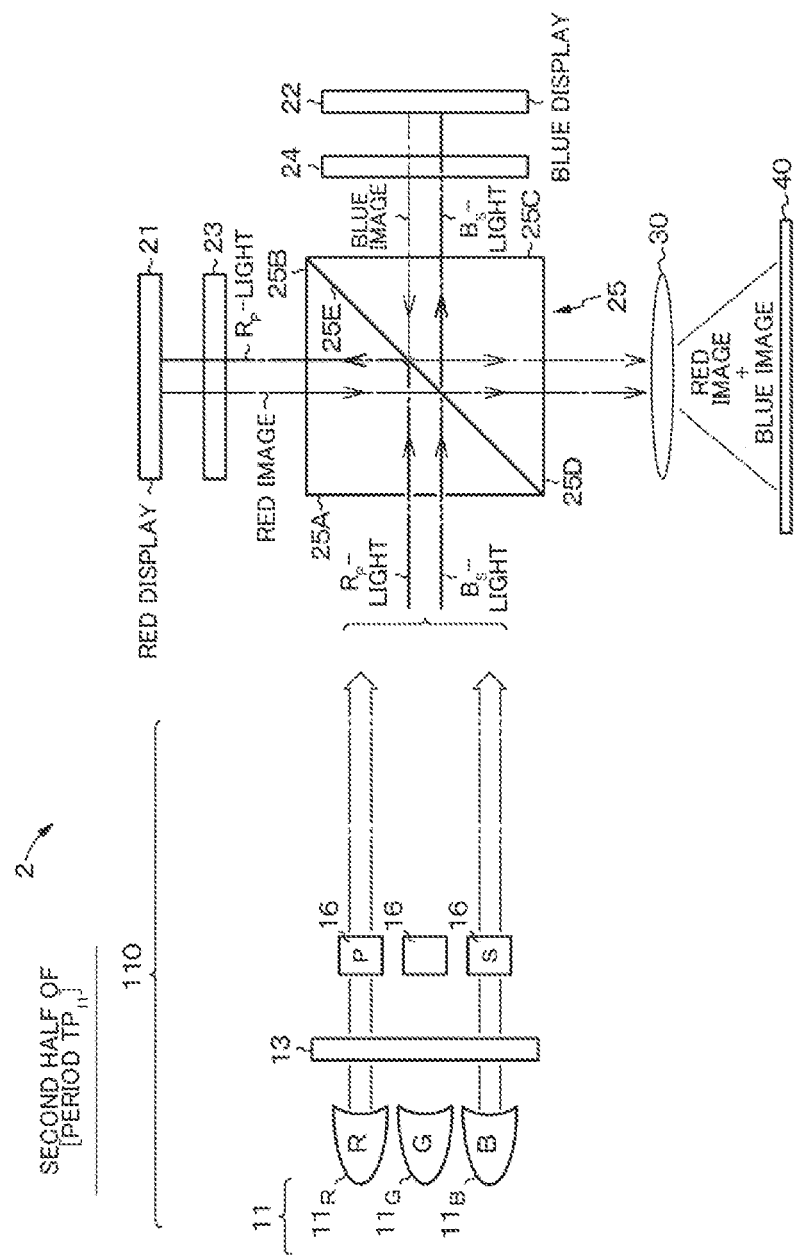
FIG. 12 is a schematic diagram for describing the operation of the image display device in the second half of the period TP11 illustrated in FIG. 2A.

Second Half of [Period $TP_{11}$] (see FIG. 12)

The first display panel 21 is subsequently driven by the red image signal in the frame. The image signal to the second display panel 22 is switched, and the second display panel 22 is driven by the blue image signal in the frame. In the light source 11, the red light source $11_R$ and the blue light source $11_B$ are in the emission state. The polarization adjusting element 16 leaves the red light in the first polarized state and puts the blue light into the second polarized state. The first image is a red image and the second image is a blue image.

Figure 13:
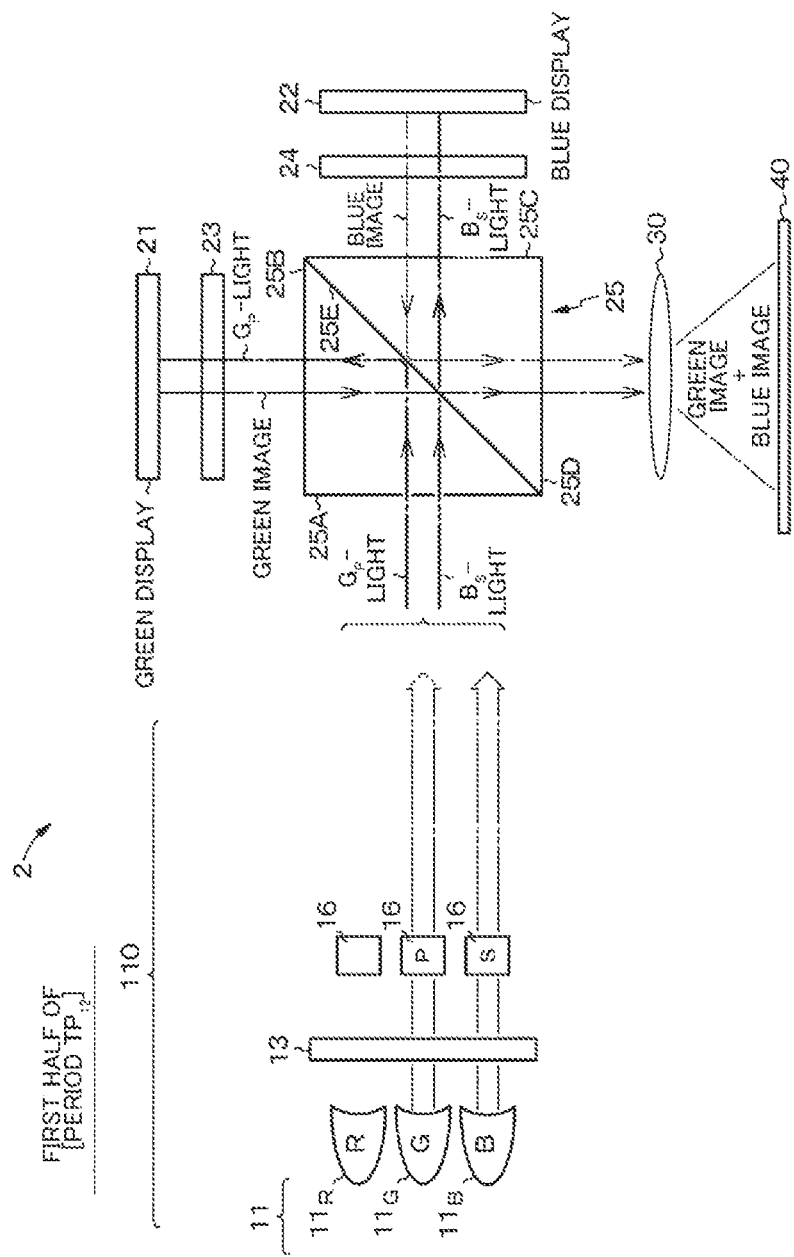
FIG. 13 is a schematic diagram for describing the operation of the image display device in the first half of the period TP12 illustrated in FIG. 2A.

First Half of [Period $TP_{12}$] (see FIG. 13)

The second display panel 22 is subsequently driven by the blue image signal in the frame. The image signal to the first display panel 21 is switched, and the first display panel 21 is driven by the green image signal in the frame. In the light source 11, the green light source $11_G$ and the blue light source 11B are in the emission state. The polarization adjusting element 16 leaves the green light in the first polarized state and puts the blue light into the second polarized state. The first image is a green image and the second image is a blue image.

Figure 14:
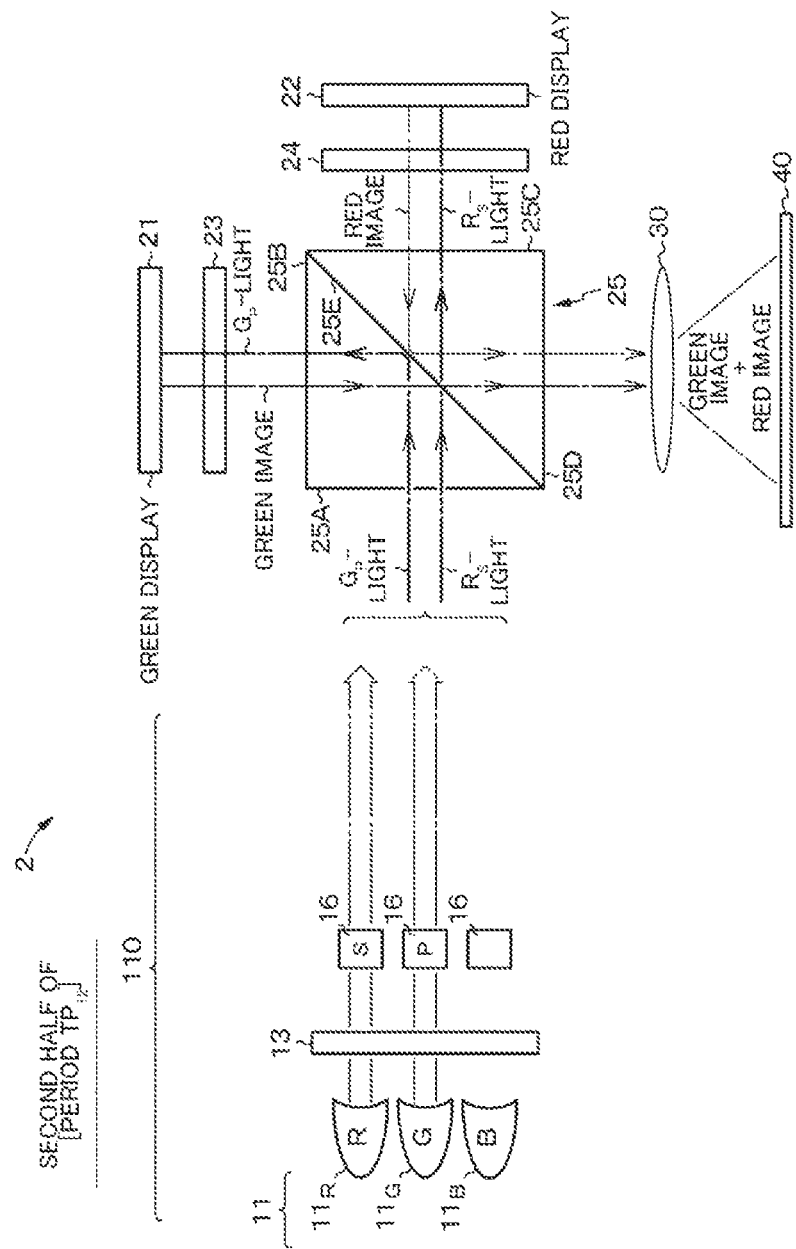
FIG. 14 is a schematic diagram for describing the operation of the image display device in the second half of the period TP12 illustrated in FIG. 2A.

Second Half of [Period $TP_{12}$] (see FIG. 14)

The first display panel 21 is subsequently driven by the green image signal in the frame. The image signal to the second display panel 22 is switched, and the second display panel 22 is driven by the red image signal in the frame. In the light source 11, the red light source $11_R$ and the green light source $11_G$ are in the emission state. The polarization adjusting element 16 leaves the green light in the first polarized state and puts the red light into the second polarized state. The first image is a green image and the second image is a red image.

Figure 15:
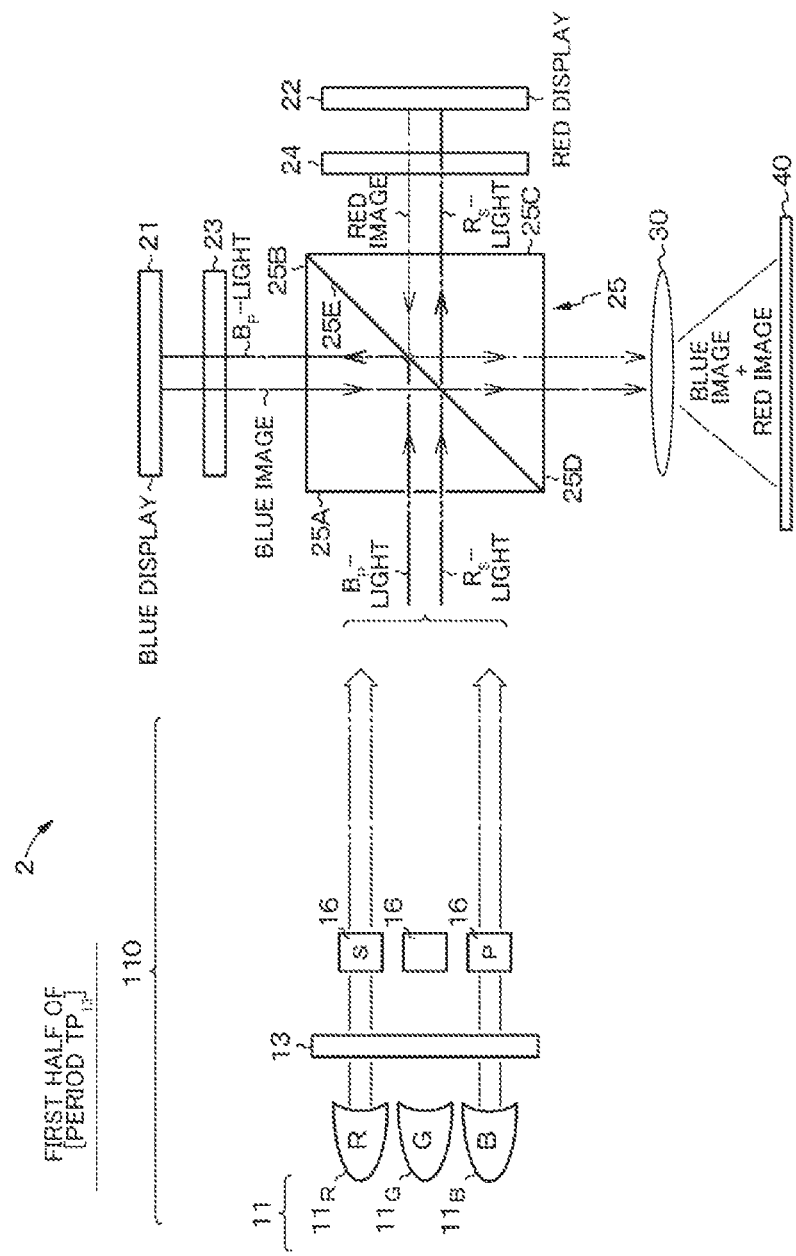
FIG. 15 is a schematic diagram for describing the operation of the image display device in the first half of the period TP13 illustrated in FIG. 2A.

First Half of [Period $TP_{13}$] (see FIG. 15)

The second display panel 22 is subsequently driven by the red image signal in the frame. The image signal to the first display panel 21 is switched, and the first display panel 21 is driven by the blue image signal in the frame. In the light source 11, the red light source $11_R$ and the blue light source 11B are in the emission state. The polarization adjusting element 16 leaves the blue light in the first polarized state and puts the red light into the second polarized state. The first image is a blue image and the second image is a red image.

Figure 16:
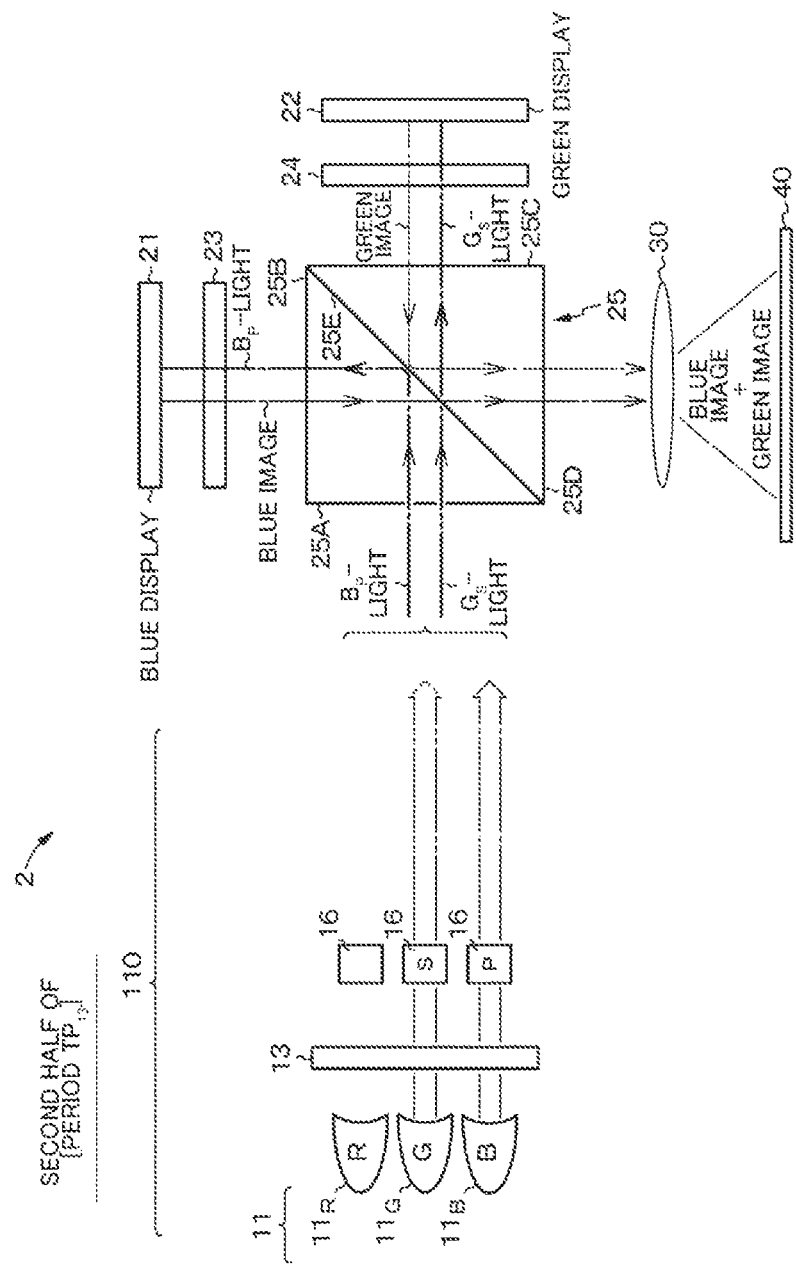
FIG. 16 is a schematic diagram for describing the operation of the image display device in the second half of the period TP13 illustrated in FIG. 2A.

Second Half of [Period $TP_{13}$] (see FIG. 16)

The first display panel 21 is subsequently driven by the blue image signal in the frame. The image signal to the second display panel 22 is switched, and the second display panel 22 is driven by the green image signal in the frame. In the light source 11, the green light source $11_G$ and the blue light source $11_B$ are in the emission state. The polarization adjusting element 16 leaves the blue light in the first polarized state and puts the green light into the second polarized state. The first image is a blue image and the second image is a green image.

Since the operations in [Period $TP_{14}$] to [Period $TP_{16}$] are basically the same as the operations in [Period $TP_{11}$] to [Period $TP_{13}$] described above, the description thereof will be omitted.

As described above, in the image display device according to the second embodiment, since the display color of the image on which the first image and the second image are superimposed changes at a high frequency exceeding the frame frequency, color break can be suppressed. Further, since both the first display panel 21 and the second display panel 22 are continuously irradiated with color light corresponding to the image signal, it is possible to improve the brightness.

Others

In the image display devices described above, the lengths of the display periods of the red image, the green image, and the blue image are the same. Since the reflectance of light also changes depending on the wavelength, in some cases, it may be desired to secure a relatively long display period for an image of a certain color. In such a case, in the first display panel and the second display panel, a driving method in which the subframe frequencies are different or a driving method in which different duties are allowed for the display periods may be used.

Figure 17:
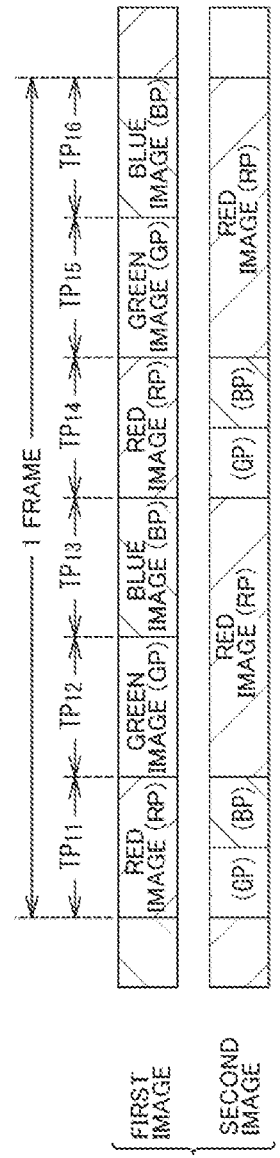
FIG. 17 is a schematic timing chart for describing a driving example when the predetermined display period of a certain display color is set to be long.

In the example illustrated in FIG. 17, a driving example in which a red image is continuously displayed during the entire period of one frame is illustrated. Usually, the reflectance decreases as the wavelength of light increases. By displaying the red images continuously, the decrease in brightness due to the decrease in reflectance is reduced. In addition, the image can be displayed in a state where the ability of the light source is maximized.

Configuration of Present Disclosure

The present disclosure can also be configured as described below.

[A1]

An image display device including: a first display panel and a second display panel in which transmittance or reflectance of light is controlled on the basis of an image signal; and a light irradiation unit that irradiates the first display panel and the second display panel with light, the device in which the first display panel and the second display panel are sequentially driven by image signals corresponding to a plurality of color light beams, and in a period in which one of the first display panel and the second display panel is driven by an image signal corresponding to any one of the plurality of color light beams, an image signal for driving the other display panel is switched.

[A2]

The image display device according to [A1] described above, the device in which the light irradiation unit irradiates the first display panel with color light corresponding to the image signal for driving the first display panel and irradiates the second display panel with color light corresponding to the image signal for driving the second display panel.

[A3]

The image display device according to [A2] described above, the device in which the light irradiation unit stops irradiation with light on the first display panel and the second display panel in a predetermined period including the time of switching the image signal for driving the first display panel and a predetermined period including the time of switching the image signal for driving the second display panel.

[A4]

The image display device according to any one of [A1] to [A3] described above, the device in which the first display panel and the second display panel are sequentially driven by image signals corresponding to red light, green light, and blue light, respectively, and the light irradiation unit irradiates the first display panel with color light corresponding to the image signal for driving the first display panel and irradiates the second display panel with color light corresponding to the image signal for driving the second display panel.

[A5]

The image display device according to any one of [A1] to [A4] described above, further including a projection unit that projects a first image obtained by the first display panel and a second image obtained by the second display panel in a superimposed manner.

[A6]

The image display device according to any one of [A1] to [A5] described above, further including a polarizing beam splitter having a first surface on which the light from the light irradiation unit is incident, a second surface and a third surface from which the incident light is emitted, and a fourth surface from which light having passed through the first display panel and light having passed through the second display panel are emitted, the device in which the first display panel is disposed to face the second surface, and the second display panel is disposed to face the third surface.

[A7]

The image display device according to [A6] described above, the device in which a predetermined wave plate is disposed between the second surface of the polarizing beam splitter and the first display panel and between the third surface of the polarizing beam splitter and the second display panel.

[A8]

The image display device according to [A6] or [A7] described above, the device in which the light irradiation unit irradiates the first surface of the polarizing beam splitter with light in a first polarized state and light in a second polarized state, the light in the first polarized state is emitted from the second surface of the polarizing beam splitter, and the light in the second polarized state is emitted from the third surface of the polarizing beam splitter.

[A9]
The image display device according to [A8] described above, the device in which the light irradiation unit includes a light source capable of emitting a plurality of color light beams.

[A10]
The image display device according to [A9] described above, the device in which the light irradiation unit includes a first light source for emitting light in a first polarized state and a second light source for emitting light in a second polarized state.

[A11]
The image display device according to [A10] described above, the device in which the light irradiation unit further includes a light irradiation polarizing beam splitter having a first incident surface on which the light from the first light source is incident, a second incident surface on which the light from the second light source is incident, and an emission surface from which the light from the first light source and the second light source are emitted.

[A12]
The image display device according to [A9] described above, the device in which the light irradiation unit includes a polarization adjusting element capable of switching the light between the first polarized state and the second polarized state for each of the plurality of color light beams.

[B1]
An electronic apparatus provided with an image display device including: a first display panel and a second display panel in which transmittance or reflectance of light is controlled on the basis of an image signal; and a light irradiation unit that irradiates the first display panel and the second display panel with light, the device in which the first display panel and the second display panel are sequentially driven by image signals corresponding to a plurality of color light beams, and in a period in which one of the first display panel and the second display panel is driven by an image signal corresponding to any one of the plurality of color light beams, an image signal for driving the other display panel is switched.

[B2]
The electronic apparatus according to [B1] described above, in which the light irradiation unit irradiates the first display panel with color light corresponding to the image signal for driving the first display panel and irradiates the second display panel with color light corresponding to the image signal for driving the second display panel.

[B3]
The electronic apparatus according to [B2] described above, in which the light irradiation unit stops irradiation with light on the first display panel and the second display panel in a predetermined period including the time of switching the image signal for driving the first display panel and a predetermined period including the time of switching the image signal for driving the second display panel.

[B4]
The electronic apparatus according to any one of [B1] to [B3] described above, in which the first display panel and the second display panel are sequentially driven by image signals corresponding to red light, green light, and blue light, respectively, and the light irradiation unit irradiates the first display panel with color light corresponding to the image signal for driving the first display panel and irradiates the second display panel with color light corresponding to the image signal for driving the second display panel.

[B5]
The electronic apparatus according to any one of [B1] to [B4] described above, further including a projection unit that projects a first image obtained by the first display panel and a second image obtained by the second display panel in a superimposed manner.

[B6]
The electronic apparatus according to any one of [B1] to [B5] described above, further including a polarizing beam splitter having a first surface on which the light from the light irradiation unit is incident, a second surface and a third surface from which the incident light is emitted, and a fourth surface from which light having passed through the first display panel and light having passed through the second display panel are emitted, the apparatus in which the first display panel is disposed to face the second surface, and the second display panel is disposed to face the third surface.

[B7]
The electronic apparatus according to [B6] described above, in which a predetermined wave plate is disposed between the second surface of the polarizing beam splitter and the first display panel and between the third surface of the polarizing beam splitter and the second display panel.

[B8]
The electronic apparatus according to [B6] or [B7] described above, in which the light irradiation unit irradiates the first surface of the polarizing beam splitter with light in a first polarized state and light in a second polarized state, the light in the first polarized state is emitted from the second surface of the polarizing beam splitter, and the light in the second polarized state is emitted from the third surface of the polarizing beam splitter.

[B9]
The electronic apparatus according to [B8] described above, in which the light irradiation unit includes a light source capable of emitting a plurality of color light beams.

[B10]
The electronic apparatus according to [B9] described above, in which the light irradiation unit includes a first light source for emitting light in a first polarized state and a second light source for emitting light in a second polarized state.

[B11]
The electronic apparatus according to [B10] described above, in which the light irradiation unit further includes a light irradiation polarizing beam splitter having a first incident surface on which the light from the first light source is incident, a second incident surface on which the light from the second light source is incident, and an emission surface from which the light from the first light source and the second light source are emitted.

[B12]
The electronic apparatus according to [B9] described above, in which the light irradiation unit includes a polarization adjusting element capable of switching the light between the first polarized state and the second polarized state for each of the plurality of color light beams.

REFERENCE SIGNS LIST 1, 2 Image display device
10, 110 Light irradiation unit
11 Light source (first light source)
$11_R$ Red light source
$11_G$ Green light source
$11_B$ Blue Light source
12 Second light source $12_R$ Red light source
$12_G$ Green light source
$12_B$ Blue light source
13, 14 Polarizing plate
15 Light irradiation polarizing beam splitter
15A Surface of light irradiation polarizing beam splitter (first incident surface)
15B Surface of light irradiation polarizing beam splitter
15C Surface of light irradiation polarizing beam splitter (emission surface)
15D Surface of light irradiation polarizing beam splitter (second incident surface)
15E Interface of light irradiation polarizing beam splitter
21 First display panel
22 First display panel
23, 24 Wave plate
25 Polarizing beam splitter
25A First surface of polarizing beam splitter
25B Second surface of polarizing beam splitter
25C Third surface of polarizing beam splitter
25D Fourth surface of polarizing beam splitter
25E Interface of polarizing beam splitter
30 Projection unit
40 Screen

The invention claimed is:

1. An image display device, comprising:
a light irradiation unit;
a first display panel configured to obtain a first image;
a second display panel configured to obtain a second image; and
a control circuit configured to:
control the light irradiation unit to irradiate the first display panel with first light and the second display panel with second light;
control one of transmittance of the first light or reflectance of the first light based on a first image signal of a plurality of image signals;
control one of transmittance of the second light or reflectance of the second light based on a second image signal of the plurality of image signals, wherein
the second image signal is different from the first image signal, and
the plurality of image signals corresponds to a plurality of color light beams;
drive, in a first period, the first display panel based on the first image signal;
drive, in the first period, the second display panel based on the second image signal and a third image signal of the plurality of image signals, wherein
the third image signal is different from the second image signal, and
the first display panel and the second display panel are configured to be sequentially driven; and
control, in a second period, the light irradiation unit to stop the irradiation of the second display panel, wherein
the second image signal is switched to the third image signal in the second period, and
the first period includes the second period.

2. The image display device according to claim 1, wherein the plurality of image signals corresponds to red light, green light, and blue light, respectively.

3. The image display device according to claim 1, further comprising:
a screen; and
a projection unit configured to project the first image and the second image on the screen in a superimposed manner.

4. The image display device according to claim 1, further comprising a polarizing beam splitter that includes:
a first surface configured to receive the first light and the second light from the light irradiation unit,
a second surface configured to emit the received first light and the received second light,
a third surface configured to emit the received first light and the received second light, and
a fourth surface configured to emit the first light having passed through the first display panel and the second light passed through the second display panel, wherein
the first display panel faces the second surface, and
the second display panel faces the third surface.

5. The image display device according to claim 4, further comprising a first wave plate and a second wave plate, wherein
the first wave plate is between the second surface of the polarizing beam splitter and the first display panel, and
the second wave plate is between the third surface of the polarizing beam splitter and the second display panel.

6. The image display device according to claim 4, wherein the control circuit is further configured to control the light irradiation unit to:
irradiate the first surface of the polarizing beam splitter with each of the first light and the second light in a first polarized state; and
irradiate the first surface of the polarizing beam splitter with each of the first light and the second light in a second polarized state,
each of the first light and the second light is in the first polarized state that is emitted from the second surface of the polarizing beam splitter, and
each of the first light and the second light is in the second polarized state that is emitted from the third surface of the polarizing beam splitter.

7. The image display device according to claim 6, wherein the light irradiation unit includes a light source configured to emit the plurality of color light beams.

8. The image display device according to claim 7, wherein the light irradiation unit includes a first light source configured to emit the first light in the first polarized state and a second light source configured to emit the second light in the second polarized state.

9. The image display device according to claim 8, wherein the light irradiation unit further includes a light irradiation polarizing beam splitter that includes:
a first incident surface configured to receive the first light from the first light source,
a second incident surface configured to receive the second light from the second light source, and
an emission surface configured to emit the first light from the first light source and the second light from the second light source.

10. The image display device according to claim 7, wherein
the light irradiation unit further includes a polarization adjusting element configured to switch each of the first light and the second light between the first polarized state and the second polarized state for each of the plurality of color light beams.

11. The image display device according to claim 1, wherein the light irradiation unit includes a plurality of polarization adjusting elements, and each of the plurality of color light beams corresponds to a respective polarization adjusting element of the plurality of polarization adjusting elements.

12. An electronic apparatus provided with an image display device, comprising:

an image display device comprising:
   a light irradiation unit;
   a first display panel configured to obtain a first image;
   a second display panel configured to obtain a second image; and
   a control circuit configured to:
      control the light irradiation unit to irradiate the first display panel with first light and the second display panel with second light;
      control one of transmittance of the first light or reflectance of the first light based on a first image signal of a plurality of image signals;
      control one of transmittance of the second light or reflectance of the second light based on a second image signal of the plurality of image signals, wherein
         the second image signal is different from the first image signal, and
         the plurality of image signals corresponds to a plurality of color light beams;
      drive, in a first period, the first display panel based on the first image signal;
      drive, in the first period, the second display panel based on by the second image signal and a third image signal of the plurality of image signals, wherein
         the third image signal is different from the second image signal, and
         the first display panel and the second display panel are configured to be sequentially driven; and
      control, in a second period, the light irradiation unit to stop the irradiation of the second display panel, wherein
         the second image signal is switched to the third image signal in the second period, and
         the first period includes the second period.

* * * * *